(12) United States Patent
Vendelbo (10) Patent No.: US 10,313,806 B2
(45) Date of Patent: Jun. 4, 2019

(54) HEARING SYSTEM, DEVICES AND METHOD OF SECURING COMMUNICATION FOR A USER APPLICATION

(71) Applicant: GN HEARING A/S, Ballerup (DK)

(72) Inventor: Allan Munk Vendelbo, Valby (DK)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 15/815,273

(22) Filed: Nov. 16, 2017

(65) Prior Publication Data

US 2018/0167749 A1 Jun. 14, 2018

(30) Foreign Application Priority Data

Dec. 8, 2016 (EP) .................................... 16202912

(51) Int. Cl.
*H04R 25/00* (2006.01)
*H04W 4/80* (2018.01)
(52) U.S. Cl.
CPC ......... *H04R 25/554* (2013.01); *H04R 25/558* (2013.01); *H04R 25/70* (2013.01); *H04W 4/80* (2018.02); *H04R 2225/55* (2013.01)
(58) Field of Classification Search
CPC .............. H04R 2225/55; H04R 25/554; H04R 25/558; H04R 25/70; H04W 4/80
USPC ................................................. 381/312, 315
See application file for complete search history.

(56) References Cited

U.S. PATENT DOCUMENTS 8,467,770 B1 6/2013 Mourad
8,503,703 B2 * 8/2013 Eaton ................... H04R 25/554
381/312
9,656,092 B2 * 5/2017 Golden ................ A61B 5/7465
2002/0054689 A1 5/2002 Zhang et al.
2004/0162980 A1 8/2004 Lesenne
(Continued)

FOREIGN PATENT DOCUMENTS

EP 3 032 857 A1 6/2016
GB 2 411 554 A 8/2005
(Continued)

OTHER PUBLICATIONS

Extended European Search Report and Written Opinion dated Feb. 23, 2017 for related European Patent Application No. EP 16202912. 8.
(Continued)

*Primary Examiner* — Khai N. Nguyen
(74) *Attorney, Agent, or Firm* — Vista IP Law Group, LLP (57) ABSTRACT

A method of securing communication for a user application on a user accessory device of a hearing system comprising a hearing device is disclosed. Securing communication for the user application comprises obtaining challenge data in a server device; transmitting the challenge data from the server device to the user application; transmitting a challenge request comprising the challenge data from the user application to the hearing device; receiving a challenge response comprising response data from the hearing device; forwarding the response data from the user application to the server device; verifying the response data in the server device based on the challenge data; and approving the user application in the server device if verifying the response data is successful.

16 Claims, 4 Drawing Sheets

(56) References Cited

U.S. PATENT DOCUMENTS

| | | | |
|---|---|---|---|
| 2005/0171950 A1* | 8/2005 | Dumitru | G06F 17/3089 |
| 2005/0210252 A1 | 9/2005 | Freeman et al. | |
| 2008/0020707 A1 | 1/2008 | Takayama | |
| 2009/0185703 A1 | 7/2009 | Aida | |
| 2009/0222659 A1 | 9/2009 | Miyabayashi et al. | |
| 2010/0174909 A1 | 7/2010 | Ashdown | |
| 2010/0205447 A1 | 8/2010 | Waldmann | |
| 2010/0225725 A1* | 9/2010 | Roth | B41J 2/2103 |
| | | | 347/107 |
| 2010/0292556 A1* | 11/2010 | Golden | A61B 5/7465 |
| | | | 600/364 |
| 2010/0306525 A1 | 12/2010 | Ferguson | |
| 2011/0030040 A1 | 2/2011 | Corrado | |
| 2011/0200214 A1 | 8/2011 | Knox | |
| 2011/0257994 A1 | 10/2011 | Givens et al. | |
| 2012/0110467 A1* | 5/2012 | Blake | G06F 9/453 |
| | | | 715/745 |
| 2012/0183164 A1 | 7/2012 | Foo et al. | |
| 2013/0047264 A1 | 2/2013 | Bjorkengren | |
| 2013/0132091 A1* | 5/2013 | Skerpac | G10L 17/005 |
| | | | 704/273 |
| 2014/0211972 A1 | 7/2014 | Kim et al. | |
| 2014/0211973 A1 | 7/2014 | Wang | |
| 2015/0125014 A1 | 5/2015 | Howes | |
| 2015/0281863 A1 | 10/2015 | Westergaard et al. | |
| 2015/0289062 A1 | 10/2015 | Ungstrup | |
| 2016/0050507 A1* | 2/2016 | Moore | A61B 5/123 |
| | | | 381/57 |
| 2016/0173278 A1 | 6/2016 | Pedersen et al. | |
| 2016/0212552 A1 | 7/2016 | Schneider | |
| 2016/0358186 A1* | 12/2016 | Radocchia | H04W 4/70 |
| 2017/0180886 A1* | 6/2017 | Van Der Loo | H04R 25/554 |
| 2017/0318400 A1 | 11/2017 | Westermann | |
| 2017/0318457 A1 | 11/2017 | Westermann | |
| 2018/0167748 A1* | 6/2018 | Vendelbo | H04L 63/123 |
| 2018/0167749 A1* | 6/2018 | Vendelbo | H04R 25/70 |
| 2018/0167809 A1* | 6/2018 | Vendelbo | H04L 9/0838 |
| 2018/0310104 A1 | 10/2018 | Westermann | |

FOREIGN PATENT DOCUMENTS

| | | |
|---|---|---|
| WO | WO 2012 109640 A2 | 8/2012 |
| WO | WO 2012 109640 A3 | 8/2012 |
| WO | WO 2015 152718 A1 | 10/2015 |
| WO | WO 2016 078709 A1 | 5/2016 |
| WO | WO 2016 078710 A1 | 5/2016 |

OTHER PUBLICATIONS

Extended European Search Report and Written Opinion dated Mar. 6, 2017 for related European Patent Application No. EP 16202915.1.

Extended European Search Report dated Jun. 8, 2017 for related European Patent Application No. 16202916.9.

Extended European Search Report dated Jun. 8, 2017 for related European Patent Application No. 16202918.5.

A Framework for Designing Ctypogaphic Key Managemenet Systems. NIST Special Pub. Elaine Barker, et al., Aug. 2013. 120 pages.

Specification of the Bluetooth System. Specification vol. 1. Version 1.1 Feb. 22, 2001. 43 Pages.

Extended European Search Report dated Feb. 24, 2017 for related European Patent Application No. 16202919.3.

Extended European Search Report dated Feb. 28, 2017 for related European Patent Application No. 16202920.1.

Non-Final Office Action dated Mar. 14, 2019 for related U.S. Appl. No. 15/813,140.

Non-Final Office Action dated Mar. 15, 2019 for related U.S. Appl. No. 15/811,677.

\* cited by examiner

HEARING SYSTEM, DEVICES AND METHOD OF SECURING COMMUNICATION FOR A USER APPLICATION

RELATED APPLICATION DATA

This application claims priority to, and the benefit of, European Patent Application No. 16202912.8, filed on Dec. 8, 2016, pending. The entire disclosure of the above application is expressly incorporated by reference herein.

FIELD

The present disclosure relates to a hearing system comprising a server device and a hearing device system, wherein the hearing device system comprises a hearing device and a user accessory device. In particular, the present disclosure relates to devices for securing communication for a user application on a user accessory device of a hearing system comprising a hearing device, and a method of securing communication for a user application on a user accessory device of a hearing system comprising a hearing device.

BACKGROUND

Wireless communication to and from different entities of a hearing system has been increasing in continuation of the developments within wireless communication technology. However, the new technologies entail new challenges for the hearing aid manufacturers to secure communication in a hearing system. Wireless communication interfaces of a hearing system desirably use an open standard-based interface. However, this poses many challenges in terms of security.

SUMMARY

There is a need for apparatus, devices and methods for providing improved security for hearing system communication. Further, there is a need for devices and methods reducing the risk of a hearing aid and hearing aid function being compromised by a third (unauthorized) party.

Accordingly, a method of securing communication for a user application on a user accessory device of a hearing system comprising a hearing device is disclosed, wherein securing communication for the user application comprises obtaining challenge data in a server device; transmitting the challenge data from the server device to the user application; optionally transmitting a challenge request comprising the challenge data from the user application to the hearing device; optionally receiving a challenge response comprising response data from the hearing device; optionally forwarding the response data from the user application to the server device; optionally receiving a response message comprising response data from the user application; verifying the response data in the server device based on the challenge data; and optionally approving the user application in the server device if verifying the response data is successful.

Further, a server device for securing communication for a user application on a user accessory device of a hearing system comprising a hearing device is disclosed. The server device is configured to approve the user application, wherein to approve the user application comprises to obtain challenge data; transmit the challenge data to the user application; receive a challenge response comprising response data from the user application; verify the response data based on the challenge data; and optionally approve the user application if the response data are verified.

Also disclosed is user application for a user accessory device of a hearing system, the user accessory device comprising a processing unit; a memory unit; and an interface, wherein the user application is configured to secure communication for the user application, and wherein to secure communication for the user application comprises to: obtain challenge data from a server device; transmit a challenge request comprising the challenge data to a hearing device of the hearing device system; receive a challenge response comprising response data from the hearing device; and transmit the response data to the server device.

It is an important advantage of the present disclosure that the risk of user sensitive data, such as hearing device settings and/or user specific software updates, being sent to or shared with third party user applications or otherwise corrupted user applications is heavily reduced or eliminated.

Further, the present disclosure allows a hearing device manufacturer to securely keep and maintain updated and correct information on user applications. Even further, a server device/hearing device manufacturer can keep updated information on and link user applications with specific hearing devices.

A method performed by a server device for securing communication with a user accessory device having a user application, the method includes: obtaining challenge data in the server device; transmitting the challenge data from the server device to the user accessory device; receiving a response data from the user accessory device; verifying the response data in the server device based on the challenge data; and approving the user application by the server device if the response data is successfully verified.

Optionally, the response data is provided by a hearing device based on the challenge data and a hearing device identifier of the hearing device.

Optionally, the response data comprises, or is indicative of, a hearing device identifier.

Optionally, the act of approving the user application comprises setting a user application status identifier to a value indicative of the user application being approved.

Optionally, the method further includes setting a user application status identifier to a value indicative of the user application not being approved if the act of verifying the response data results in a failed verification.

Optionally, the method further includes generating a linking information for linking the user application to a hearing device, and storing the linking information in a memory of the server device if the response data is successfully verified.

Optionally, the method further includes receiving a request for the challenge data transmitted from the user accessory device.

Optionally, the request for the challenge data is based on a satisfaction of a criterion.

Optionally, the method further includes: storing an approval timestamp indicative of time of last approval; determining if an approval criterion based on the approval timestamp is fulfilled; and initiating secured communication for the user application if the approval criterion is fulfilled.

Optionally, the method further includes transmitting a hearing device setting specific for a hearing device to the user accessory device, wherein the act of transmitting is performed after the act of approving.

Optionally, the challenge data is stored in the server device.

Optionally, the act of obtaining the challenge data comprises calculating the challenge data.

Optionally, the user accessory device is configured to transmit a challenge request comprising the challenge data to a hearing device, receive a challenge response comprising the response data from the hearing device, and transmit the response data.

A server device for securing communication with a user accessory device having a user application, includes: a communication interface configured to communicate with the user accessory device; and a processing unit coupled to the communication interface; wherein the processing unit is configured to: obtain challenge data; transmit the challenge data to the user accessory device; receive a response data from the user accessory device; verify the response data based on the challenge data; and approve the user application if the response data is successfully verified.

Optionally, the processing unit is configured to determine if an approval criterion is fulfilled, the server device being configured to initiate secured communication with the user accessory device if the approval criterion is fulfilled; wherein the approval criterion comprises a first approval criterion and a second approval criterion; and wherein the approval criterion is considered as being fulfilled if the first approval criterion and/or the second approval criterion is fulfilled.

Optionally, the user accessory device is configured to transmit a challenge request comprising the challenge data to a hearing device, receive a challenge response comprising the response data from the hearing device, and transmit the response data.

A program product includes a set of instructions, an execution of which by a processing unit of a server device will cause the server device to perform a method, the method comprising: obtaining challenge data in the server device; transmitting the challenge data from the server device to a user accessory device, the user accessory device having a user application; receiving a response data from the user accessory device; verifying the response data in the server device based on the challenge data; and approving the user application if the response data is successfully verified.

Optionally, the user accessory device is configured to determine if a criterion is fulfilled, and to initiate secured communication if the criterion is fulfilled.

Optionally, the act of obtaining the challenge data is performed in response to a request for the challenge data received by the server device.

Optionally, the user accessory device is configured to transmit a challenge request comprising the challenge data to a hearing device, receive a challenge response comprising the response data from the hearing device, and transmit the response data.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The present disclosure relates to improved security in hearing system communication. The hearing system comprises a server device, a user accessory device having a user application installed thereon and a hearing device. The server device may be controlled by the hearing device manufacturer. The server device may be a distributed server device, i.e. a server device with distributed processor. Namely, the method, user application and server device disclosed herein enables hearing system communication that is robust against security threats, vulnerabilities and attacks by implementing appropriate safeguards and countermeasures, such as security mechanisms, to protect against threats and attacks. The present disclosure relates to hearing system communication that is robust against replay attacks, unauthorized access, battery exhaustion attacks, and man-in-the-middle attacks.

As used herein the term "identifier" refers to a piece of data that is used for identifying, such as for categorizing, and/or uniquely identifying. The identifier may be in a form of a word, a number, a letter, a symbol, a list, an array or any combination thereof. For example, the identifier as a number may be in the form of an integer, such as unsigned integer, unit, with a length of e.g. 8 bits, 16 bits, 32 bits, or more, such as an array of unsigned integers. An identifier may have a length of several bytes. For example, a hearing device identifier may have a length of 20 bytes.

The user accessory device comprises a memory unit and an interface respectively connected to a processing unit. The memory unit may include removable and non-removable data storage units including, but not limited to, Read Only Memory (ROM), Random Access Memory (RAM), etc. The memory unit has a user application stored thereon. The interface comprises an antenna and a wireless transceiver, e.g. configured for wireless communication at frequencies in the range from 2.4 to 2.5 GHz. The interface may be configured for communication, such as wireless communication, with the hearing device comprising an antenna and a wireless transceiver.

The method comprises obtaining challenge data in a server device. Obtaining challenge data may comprise generating the challenge data, e.g. based on a default challenge value and/or a timestamp. Accordingly, the server device may be configured to generate the challenge data, e.g. based on a default challenge value and/or a timestamp. The server device may be configured to generate the challenge data at a certain interval, such as every 5 minutes, every 10 minutes, or every 30 minutes. While a short time between generation of (different) challenge data may increase security, a too short time between generation of (different) challenge data may set too high timing requirements for the user application/hearing device, which in turn leads to unnecessary faulty verifications and requires power-consuming challenge-response generation in the hearing device. The challenge data may be random or pseudo-random. The challenge data may comprise at least 8 bytes, such as at least 16 bytes. The challenge data may be a 16-bytes value. The server device may be configured to generate the challenge data based on a look-up table and/or a function, e.g. having a timestamp as input. Obtaining challenge data based on a timestamp value enables and/or provides challenge data with a built-in validity period. Obtaining challenge data with a given interval enables and/or provides challenge data with a built-in validity period.

The present disclosure relates to secure communication between entities of a hearing system. The hearing system comprises a server device and a hearing device system, the hearing device system comprising a user accessory device and a hearing device. The user accessory device forms an accessory device to the hearing device. The user accessory device is typically paired or otherwise wirelessly coupled to the hearing device. The hearing device may be a hearing aid, e.g. of the behind-the-ear (BTE) type, in-the-ear (ITE) type, in-the-canal (ITC) type, receiver-in-canal (RIC) type or receiver-in-the-ear (RITE) type. Typically, the hearing device system is in possession of and controlled by the hearing device user.

Obtaining challenge data may comprise storing the challenge data in the server device. The server device may be configured to delete the challenge data after verifying the response data. The method may comprise deleting the challenge data after a certain period of time and/or replacing the challenge data with new challenge data.

The method comprises transmitting the challenge data from the server device to the user application.

The method comprises transmitting a challenge request comprising the challenge data from the user application to the hearing device.

The method comprises receiving a challenge response, e.g. in the user application, the challenge response comprising response data from the hearing device. The response data may comprise at least 8 bytes, such as at least 16 bytes or at least 32 bytes. The response data may have a length in the range from 16 to 72 bytes. The response data may comprise a hearing device identifier. The response data may comprise a key identifier for enabling the server device to use or apply the correct keying material when verifying the response data. The response data may comprise hearing device challenge data generated in the hearing device.

The response data comprises a response value, e.g. a challenge response value, and/or hearing device data. The response data may comprise a checksum value based on the response value and/or the hearing device data. The response value may be based on the challenge data and/or hearing device data, e.g. a hearing device identifier. The response value may be generated based on one or more of the challenge data from the server device, a hearing device key identified by the key identifier, the hearing device identifier, and hearing device challenge data. The response value may be based on a static string. The response value may be encrypted using one or more of challenge data from the server device, a key identified by the key identifier, the hearing device identifier, and hearing device challenge data as keying material.

The method comprises forwarding the response data from the user application to the server device, e.g. in a response message. The response data, e.g. the response value of the response data, are verified in the server device based on the challenge data. Verifying the response data in the server device based on the challenge data may comprise calculating the challenge data, e.g. based on a default challenge value and/or a timestamp. Verifying the response data in the server device based on the challenge data may comprise retrieving the challenge data from a memory of the server device. Verifying the response data in the server device may be based on hearing device challenge data of the response data. Verifying the response data in the server device may be based on hearing device identifier of the response data. Verifying the response data may comprise calculating a verification value based on the challenge data from the server device and/or one or more of a key identified by the key identifier, hearing device challenge data, and hearing device identifier of the response data. Verifying the response data may comprise comparing the verification value with the response value. The response data may be verified (verifying is successful) if the verification value corresponds to the response value.

The method optionally comprises approving the user application in the server device if verifying the response data is successful. Thus, the server device regards the user application as a trusted entity in the system if verifying the response data is successful. In other words, the user application can be said to be white-listed in the server device if verifying the response data is successful.

The method optionally comprises disapproving the user application in the server device if verifying the response data fails. Thus, the server device may regard the user application as an un-trusted entity in the system if verifying the response data is successful. The user application may be black-listed, e.g. for a certain period, in the server device if verifying the response data fails, e.g. if verifying the response data fails for a number of times, e.g. two, three or more. The method may comprise setting a user application status identifier to a value indicative of the user application not being approved if verifying the response data fails.

The method may comprise determining the response data, or at least a response value thereof, in the hearing device based on the challenge data and/or hearing device identifier of the hearing device. Thus, the hearing device may be configured to generate the response data based on the challenge data and/or a hearing device identifier. Response data, such as a response value, based on a hearing device identifier enables the server device to authenticate the hearing device. The response data optionally comprises or is indicative of a hearing device identifier. Thus, the server device can identify a specific hearing device.

In the method, receiving a challenge response comprising response data from the hearing device may be performed by the user application.

In the method, approving the user application comprises setting a user application status identifier to a value indicative of the user application being approved.

The method may comprise linking the user application to a hearing device, e.g. to the hearing device identifier of the hearing device, in a memory of the server device if verifying the response data is successful.

The method may comprise transmitting a request for challenge data from the user application. Thus, the user application and/or hearing device may be able to initiate the secure communication between the user application and the server device, e.g. if the user application is updated and/or if the user accessory device and/or the user application is restarted, in turn increasing the security level.

The request for challenge data may be transmitted if a first approval criterion, e.g. in the user application, is fulfilled. The first approval criterion may comprise determining, e.g. in the user application, if the user application has been approved earlier, wherein the first approval criterion is fulfilled if the user application has not been approved earlier.

The first approval criterion may be fulfilled if the user application is started for the first time, e.g. after installation of the user application and/or after repowering of the user accessory device. The first approval criterion may be fulfilled if the user application has been updated to a new version.

The method may comprise storing an approval timestamp indicative of time of last approval; determining if a second approval criterion based on the approval timestamp is fulfilled; and initiate securing communication for the user application if the second approval criterion is fulfilled. Thereby is ensured that the server device approves/disapproves a user application with a certain frequency, further increasing the security in the hearing system by keeping an updated user application database in the server device and to optimize hearing system communication.

In the method, approving the user application may comprise transmitting hearing device settings specific for the hearing device to the user application. Approving the user application may comprise transmitting hearing device operating parameters specific for the hearing device to the user application.

The method may comprise not approving or disapproving the user application if response data are not received within an approval period, e.g. from obtaining challenge data or transmitting the challenge data. In one or more exemplary server devices/methods, the length of an approval period may be determined by a frequency of determining new challenge data. In one or more exemplary devices/methods, challenge data are calculated or generated with a given interval, such as every 5 minutes or every 10 minutes.

The method may comprise establishing a secure session between the user application and the hearing device and optionally transmitting the challenge request in the secure session, such as an integrity-protected, encrypted, authenticated, and/or mutually authenticated session. The challenge response may be received in the secure session.

The method may comprise establishing a secure session, such as an integrity-protected, encrypted, authenticated, and/or mutually authenticated session, between the server device and the user application, and optionally transmitting the challenge data in the secure session. The response data may be forwarded from the user application to the server device in the secure session.

The server device may be configured to determine if an approval criterion is fulfilled, the server device being configured to initiate securing communication for the user application if the approval criterion is fulfilled, wherein the approval criterion comprises a first approval criterion and a second approval criterion, and wherein the approval criterion is fulfilled if the first approval criterion and/or the second approval criterion is fulfilled. The second approval criterion may be fulfilled if the time since last approval is longer than an approval time threshold, e.g. one or more days, such as 7 days, 14 days. Thus, approval of a user application with a minimum frequency may be employed to ensure updated user application data in the server device.

The present disclosure also relates to a user application for a user accessory device of a hearing system. The user accessory device may be a smartphone, a smartwatch or a tablet computer. The user application is, when installed on the user accessory device, configured to secure communication for the user application.

The user application may be configured to determine if a first approval criterion is fulfilled and to initiate securing communication for the user application if the first approval criterion is fulfilled, and wherein to obtain challenge data comprises to transmit a request for challenge data to the server device. The request for challenge data is a message requesting the server device to transmit challenge data to the user application. Thus, the user application and/or hearing device (via the user application) can actively initiate approval of the user application in the server device.

By enabling hearing system entities to initiate securing communication for the user application, the approval procedures can be optimized, e.g. by enabling the approval procedure to be initiated only when necessary or when justified due to changes in the different entities in the hearing system.

Throughout, the same reference numerals are used for identical or corresponding parts.

Figure 1:
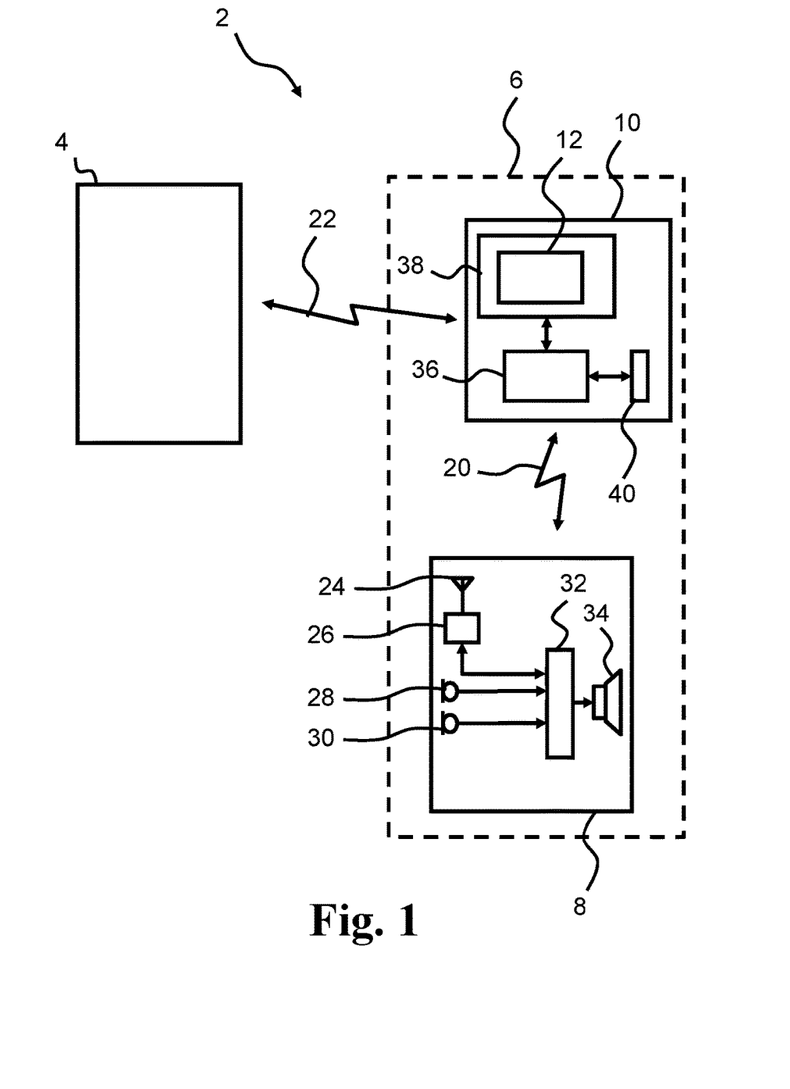
FIG. 1 schematically illustrates a hearing system.

FIG. 1 shows an exemplary hearing system. The hearing system 2 comprises a server device 4 and a hearing device system 6 comprising a hearing device 8 and a user accessory device 10. The user accessory device 10 is a smartphone configured to wirelessly communicate with the hearing device 8. A user application 12 is installed on the user accessory device 10. The user application may be for controlling the hearing device 8 and/or assisting a hearing device user. In one or more exemplary user applications, the user application 12 is configured to transfer firmware and/or hearing device settings to the hearing device.

The server device 4 and/or the user application 12 may be configured to perform any acts of the method disclosed herein. The hearing device 2 may be configured to compensate for hearing loss of a user of the hearing device 2. The hearing device 8 is configured to configured to communicate with the user accessory device 10/user application 12, e.g. using a wireless and/or wired first communication link 20. The first communication link 20 may be a single hop communication link or a multi-hop communication link. The first communication link 20 may be carried over a short-range communication system, such as Bluetooth, Bluetooth low energy, IEEE 802.11 and/or Zigbee.

The user accessory device 10/user application 12 is configured to connect to the server device 4 over a network, such as the Internet and/or a mobile phone network, via a second communication link 22. The server device 4 may be controlled by the hearing device manufacturer. The hearing device 8 comprises an antenna 24 and a radio transceiver 26 coupled to the antenna 4 for receiving/transmitting wireless communication including first communication link 20. The hearing device 8 comprises a set of microphones comprising a first microphone 28 and optionally a second microphone 30 for provision of respective first and second microphone input signals. The hearing device 8 may be a single-microphone hearing device. The hearing device 8 comprises a memory unit (not shown) connected to the processor, wherein hearing device settings are stored in the memory unit.

The hearing device 2 comprises a processor 32 connected to the transceiver 26 and microphones 28, 30 for receiving and processing input signals. The processor 32 is configured to compensate for a hearing loss of a user based on hearing device settings and to provide an electrical output signal based on the input signals. A receiver 34 converts the electrical output signal to an audio output signal to be directed towards an eardrum of the hearing device user.

The user accessory device 10 comprises a processing unit 36, a memory unit 38, and interface 40. The user application 12 is installed in the memory unit 38 of the user accessory device 10 and is configured to secure communication for the user application, wherein to secure communication for the user application comprises to obtain challenge data from the server device 4; transmit a challenge request comprising the challenge data to the hearing device 8; receive a challenge response comprising response data from the hearing device 8; and transmit the response data to the server device 4.

Figure 2:
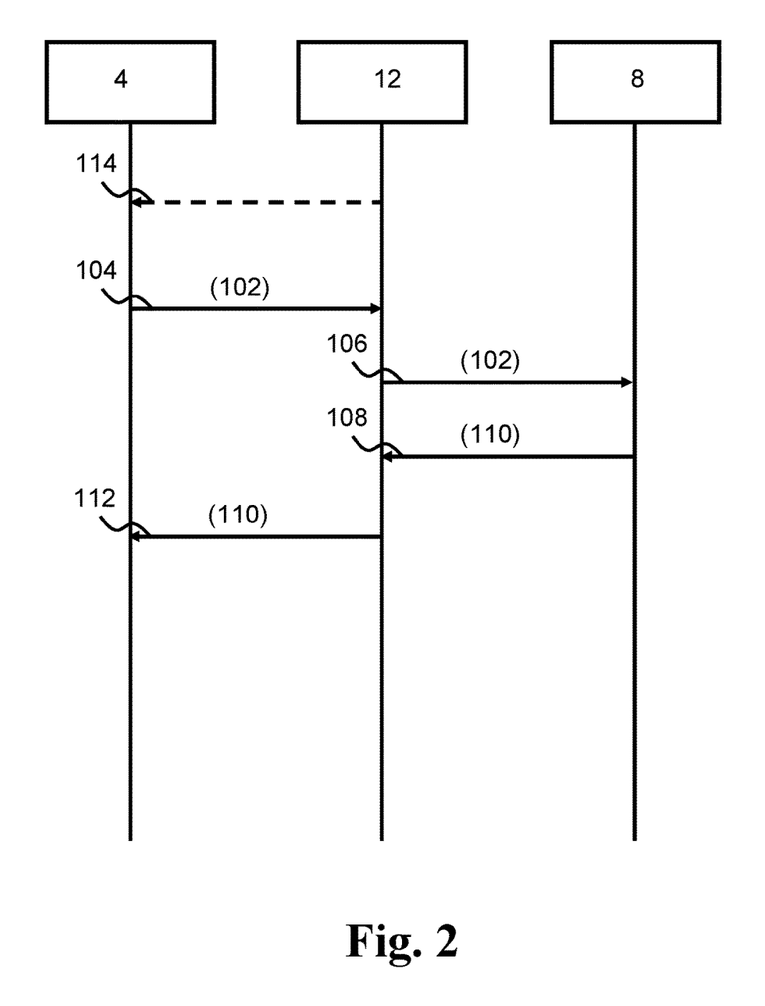
FIG. 2 shows an exemplary signaling diagram.

FIG. 2 shows an exemplary signaling diagram 100 between the entities 4, 8, 12 of the hearing system 2 illustrating an exemplary method of securing communication for a user application on a user accessory device of a hearing system comprising a hearing device. Securing communication for the user application comprises obtaining challenge data in the server device 4. The method comprises transmitting the challenge data 102 in a challenge message 104 from the server device 4 to the user application 12. The user application 12 receives the challenge data and transmits a challenge request 106 comprising the challenge data 102 from the user application 12 to the hearing device 8. The hearing device 8 generates response data based on the challenge data and optionally a hearing device identifier of the hearing device, and transmits a challenge response 108 to the user application 12, the user application receiving the challenge response 108 comprising response data 110 from the hearing device 8. The user application forwards the response data 110 in a response message 112 to the server device 4, and the server device 4 verifies the response data 110 based on the challenge data and approves the user application 12 in the server device 4 if verifying the response data 110 is successful.

Optionally, the method comprises transmitting a request 114 for challenge data from the user application 12 to the server device, e.g. if a first approval criterion is fulfilled. In the illustrated hearing system, the first approval criterion is fulfilled if the user application has started for the first time or the user application has been updated. Receipt of the request for challenge data in the server device 4, i.e. a first approval criterion fulfilled in server device, triggers securing communication for the user application. The server device 4 is configured to determine if an approval criterion is fulfilled and the server device 4 is configured to initiate securing communication for the user application if the approval criterion is fulfilled. The approval criterion in the server device comprises a first approval criterion and optionally a second approval criterion. The second approval criterion is fulfilled if the user application has not been approved for a certain period of time, e.g. 14 days. Thus, the second approval criterion may be based on an approval timestamp indicative of time of last approval of the user application. The approval criterion is fulfilled if the first approval criterion or the second approval criterion is fulfilled.

Figure 3:
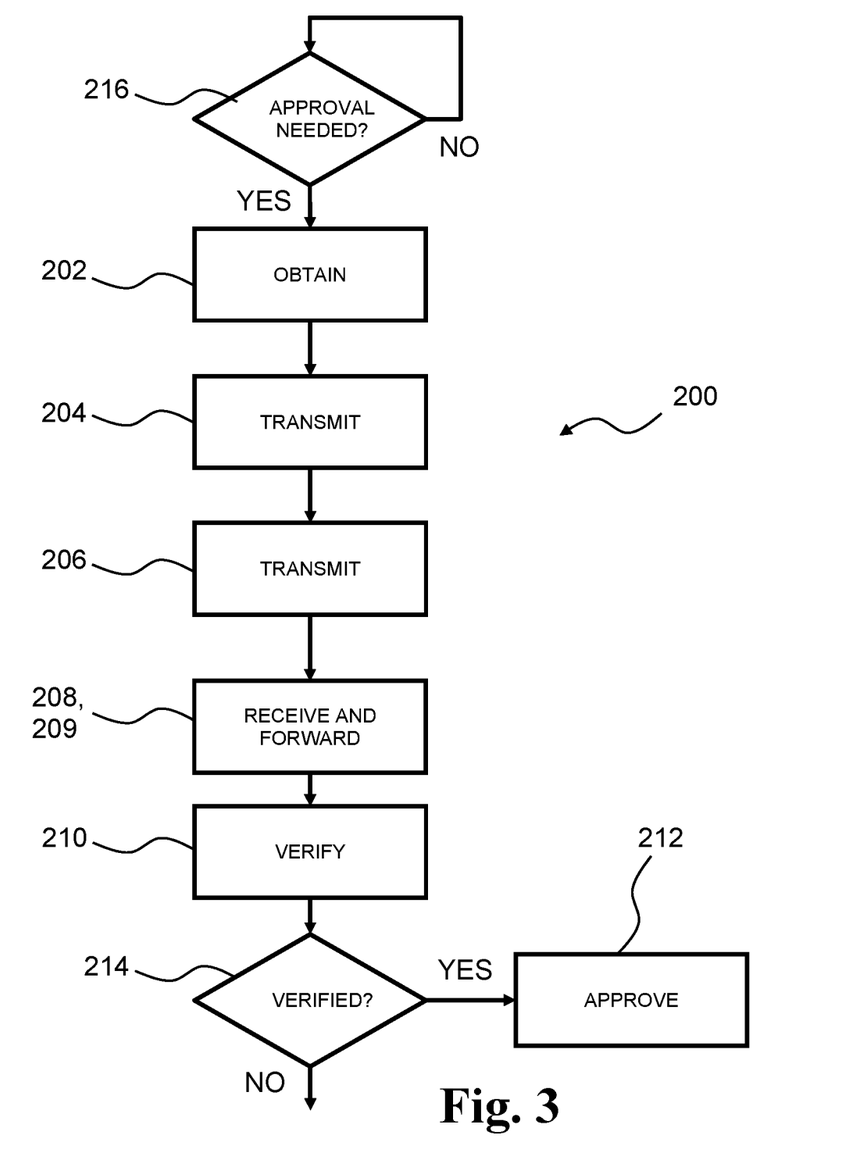
FIG. 3 is a flow diagram of an exemplary method.

FIG. 3 shows a flow diagram of an exemplary method of securing communication for a user application on a user accessory device of a hearing system comprising a hearing device. In the method 200, securing communication for the user application comprises obtaining 202 challenge data in a server device; transmitting 204 the challenge data from the server device to the user application; transmitting 206 a challenge request comprising the challenge data from the user application to the hearing device; receiving 208 a challenge response comprising response data from the hearing device; and forwarding 209 the response data from the user application to the server device. The method 200 comprises verifying 210 the response data in the server device based on the challenge data; and approving 212 the user application in the server device if verifying the response data is successful 214. Optionally, the method comprises determining 216 if an approval criterion is fulfilled in the server device and proceed with obtaining 202 challenge data if the approval criterion is met. If so, the method initiates or proceeds to securing communication for the user application.

Figure 4:
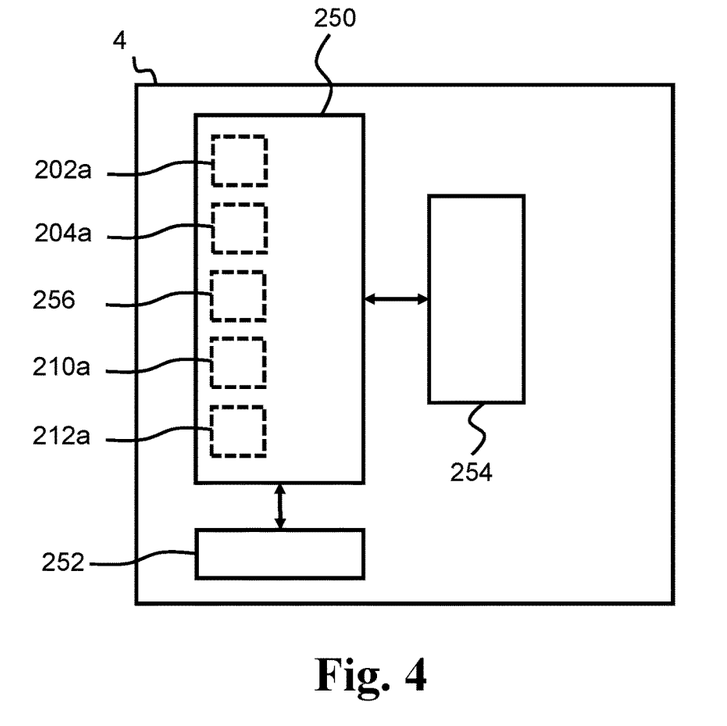
FIG. 4 schematically illustrates an exemplary server device.

FIG. 4 shows an exemplary server device for securing communication for a user application on a user accessory device of a hearing system comprising a hearing device. The server device 4 comprises a processing unit 250, a memory unit 252, e.g. comprising a database, and an interface 254. The server device 4 is configured to approve the user application, wherein to approve the user application comprises to obtain challenge data, e.g. with obtain module 202a. To obtain challenge data comprises to generate challenge data, e.g. based on a default challenge value and/or a timestamp. The challenge data has a length of 16 bytes. The server device is configured to transmit the challenge data via the interface 254 to a user application of a user accessory device in a challenge message, e.g. with transmit module 204a, and receive a response message comprising response data from the user application via the interface 254, e.g. by receive module 256. The server device is configured to verify the response data, e.g. a response value of the response data, based on the challenge data and/or a hearing device identifier, e.g. by verification module 210a. The server device may comprise a hardware security module, e.g. as part of verification module 210a, configured to verify the response data/response value. If the response data are verified, the server device is configured to approve the user application, e.g. with approval module 212a. To verify the response data optionally comprises calculating the challenge data and verify the response data based on the calculated challenge data. Calculating challenge data as part of the response data verification eliminates the need for memory in the server device and storing of challenge data. To verify the response data comprises to verify a response value of the response data e.g. based on the challenge data and/or a hearing device identifier of the response data. To verify the response data in the server device may comprise to verify a checksum value of the response data.

The server device 4 is optionally configured to receive a request for challenge data from the user application via the interface 254, and to initiate securing communication for the user application upon receipt of the request for challenge data from the user application. Further, the server device 4 is optionally configured to determine if a second approval criterion based on a last approval timestamp is fulfilled; and to initiate approval of the user application if the second approval criterion is fulfilled, e.g. if the user application has not been approved for a certain period of time, e.g. 14 days.

The server device 4 may be arranged to execute at least parts of methods of securing communication for a user application on a user accessory device of a hearing system as disclosed herein. The server device or the processing unit 250 may further comprise a number of optional functional modules, such as any of an obtain module 202a configured to perform step 202, a transmit module 204a configured to perform step 204, a receive module 256 configured to receive a response message, a verification module 210a configured to perform step 210, and an approval module 212a configured to perform step 212. In general terms, each functional module may be implemented in hardware or in software.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 2 hearing system
4 server device
6 hearing device system
8 hearing device
10 user accessory device
12 user application
20 first communication link
22 second communication link
24 antenna
26 radio transceiver
28 first microphone
30 second microphone
32 processor
34 receiver
36 processing unit
38 memory unit
40 interface
100 signalling diagram
102 challenge data
104 challenge message
106 challenge request
108 challenge response
110 response data
112 response message
114 request for challenge data
200 method of securing communication for a user application
202 obtaining challenge data in a server device
202a obtain module
204 transmitting the challenge data
204a transmit module
206 transmitting a challenge request comprising the challenge data
208 receiving a challenge response comprising response data
209 forwarding the response data
210 verifying the response data based on the challenge data
210a verification module
212 approving the user application
212a approval module
214 verification of response data successful?
216 determining if an approval criterion is fulfilled
250 processing unit
252 memory unit
254 interface
256 receive module

The invention claimed is:

1. A method performed by a server device for securing communication with a user accessory device having a user application, the method comprising:
obtaining challenge data in the server device;
transmitting the challenge data from the server device to the user accessory device;
receiving a response data from the user accessory device;
verifying the response data in the server device based on the challenge data; and
approving the user application by the server device if the response data is successfully verified;
wherein the act of approving the user application comprises setting a user application status identifier to a value indicative of the user application being approved.

2. The method according to claim 1, wherein the response data is provided by a hearing device based on the challenge data and a hearing device identifier of the hearing device, and wherein the response data is transmitted from the hearing device to the user accessory device, which is configured to transmit the response data for reception by the server device.

3. The method according to claim 1, wherein the response data comprises, or is indicative of, a hearing device identifier.

4. The method according to claim 1, further comprising generating a linking information for linking the user application to a hearing device, and storing the linking information in a memory of the server device if the response data is successfully verified.

5. The method according to claim 1, further comprising receiving a request for the challenge data transmitted from the user accessory device.

6. The method according to claim 5, wherein the request for the challenge data is based on a satisfaction of a criterion.

7. The method according to claim 1, further comprising:
storing an approval timestamp indicative of time of last approval;
determining if an approval criterion based on the approval timestamp is fulfilled; and
initiating secured communication for the user application if the approval criterion is fulfilled.

8. The method according to claim 1, further comprising transmitting a hearing device setting specific for a hearing device to the user accessory device, wherein the act of transmitting is performed after the act of approving.

9. The method according to claim 1, wherein the challenge data is stored in the server device.

10. The method according to claim 1, wherein the act of obtaining the challenge data comprises calculating the challenge data.

11. The method according to claim 1, wherein the user accessory device is configured to transmit a challenge request comprising the challenge data to a hearing device, receive a challenge response comprising the response data from the hearing device, and transmit the response data to the server device.

12. A product having a non-transitory medium storing a set of instructions, an execution by the server device of which will cause the method of claim 1 to be performed.

13. A method performed by a server device for securing communication with a user accessory device having a user application, the method comprising:
obtaining challenge data in the server device;
transmitting the challenge data from the server device to the user accessory device;
receiving a response data from the user accessory device;
verifying the response data in the server device based on the challenge data; and
approving the user application by the server device if the response data is successfully verified, and setting a user application status identifier to a value indicative of the user application not being approved if the act of verifying the response data results in a failed verification.

14. A server device for securing communication with a user accessory device having a user application, comprising:
a communication interface configured to communicate with the user accessory device; and
a processing unit coupled to the communication interface;

wherein the processing unit is configured to:
obtain challenge data;
transmit the challenge data to the user accessory device;
receive a response data from the user accessory device;
verify the response data based on the challenge data; and
approve the user application if the response data is successfully verified; and
wherein the processing unit is configured to approve the user application by setting a user application status identifier to a value indicative of the user application being approved.

15. The server device according to claim 14, wherein the processing unit is configured to determine if an approval criterion is fulfilled, the server device being configured to initiate secured communication with the user accessory device if the approval criterion is fulfilled;
wherein the approval criterion comprises a first approval criterion and a second approval criterion; and
wherein the approval criterion is considered as being fulfilled if the first approval criterion and/or the second approval criterion is fulfilled.

16. The server device according to claim 14, wherein the user accessory device is configured to transmit a challenge request comprising the challenge data to a hearing device, receive a challenge response comprising the response data from the hearing device, and transmit the response data to the server device.

* * * * *